(12) United States Patent
Sim et al.

(10) Patent No.: US 12,392,429 B2
(45) Date of Patent: Aug. 19, 2025

(54) PIPING SYSTEM COMPRISING PIPE BLOCK

(71) Applicant: HS R & A Co., Ltd., Yangsan-si (KR)

(72) Inventors: Jae Won Sim, Yangsan-si (KR); Jae Hyeok Choi, Yangsan-si (KR); Young Jun Kim, Yangsan-si (KR); Kwon Sik Hwang, Yangsan-si (KR); Jun Young Bae, Yangsan-si (KR); Ho Yeon Lee, Yangsan-si (KR)

(73) Assignee: HS R & A CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 18/539,476

(22) Filed: Dec. 14, 2023

(65) Prior Publication Data
US 2025/0164047 A1    May 22, 2025

(30) Foreign Application Priority Data
Nov. 16, 2023 (KR) .................. 10-2023-0159417

(51) Int. Cl.
*F16L 23/00* (2006.01)
*F16L 9/00* (2006.01)
(Continued)

(52) U.S. Cl.
CPC .......... *F16L 23/006* (2013.01); *F16L 9/00* (2013.01); *F16L 41/082* (2013.01); *F16L 13/163* (2013.01)

(58) Field of Classification Search
CPC ....... F16L 23/006; F16L 41/08; F16L 41/082; F16L 13/163
See application file for complete search history.

(56) References Cited

U.S. PATENT DOCUMENTS 3,529,855 A * 9/1970 Bragg .................. F16L 13/163
5,596,881 A * 1/1997 Wilson ................. F16L 41/082
(Continued)

FOREIGN PATENT DOCUMENTS

EP        276483 B * 5/1991 ............ F16L 13/163
JP    H7-12283 A    1/1995
(Continued)

OTHER PUBLICATIONS

EP-276483-B—Machine Translation—English (Year: 1991).*
(Continued)

*Primary Examiner* — William S. Choi
(74) *Attorney, Agent, or Firm* — Crowell & Moring LLP; John C. Freeman

(57) ABSTRACT

A piping system including a pipe and a pipe block coupled to an end of the pipe. The pipe includes: a flange positioned at the end and protruding in a radially outward direction along an outer circumference of the pipe; and a coupling portion having a nipple that is inserted into the pipe block. The pipe block includes: an insertion hole into which the pipe is coupled; and a lip protruding from a surface in which the insertion hole is formed in a circumferential direction along an outer circumference of the insertion hole. An inner diameter of the lip is equal to or greater than an outer diameter of the flange, and when the pipe is coupled to the pipe block, the flange is positioned inside the lip and the lip is deformed in a radially inward direction of the pipe to grip and fix the pipe.

2 Claims, 17 Drawing Sheets

(51) Int. Cl.
*F16L 13/16* (2006.01)
*F16L 41/08* (2006.01)

(56) References Cited

U.S. PATENT DOCUMENTS

| | | | | |
|---|---|---|---|---|
| 5,774,982 | A | * | 7/1998 | Hutchison ............. F16L 41/082 |
| 6,082,333 | A | * | 7/2000 | Vattelana |
| 7,344,164 | B2 | * | 3/2008 | Ichimura ............... F16L 41/082 |
| 7,364,208 | B2 | * | 4/2008 | Ichimura ............... F16L 41/082 |
| 11,840,124 | B2 | | 12/2023 | Choi et al. |
| 2003/0080564 | A1 | * | 5/2003 | Izumi .................... F16L 41/082 |
| 2014/0300106 | A1 | | 10/2014 | Kim et al. |
| 2021/0316592 | A1 | | 10/2021 | Park et al. |
| 2023/0296195 | A1 | * | 9/2023 | Harris |

FOREIGN PATENT DOCUMENTS

| | | |
|---|---|---|
| JP | 2003-262291 A | 9/2003 |
| JP | 2007-192274 A | 8/2007 |
| JP | 2010-156419 A | 7/2010 |
| KR | 10-2009-0037130 A | 4/2009 |
| KR | 10-1023940 B1 | 3/2011 |
| KR | 10-2011-0105594 A | 9/2011 |
| KR | 10-1220436 B1 | 1/2013 |
| KR | 10-1591943 B1 | 2/2016 |
| KR | 10-2021-0125669 A | 10/2021 |
| KR | 10-2022-0067712 A | 5/2022 |

OTHER PUBLICATIONS

Prioritized Examination Decision with English Translation, dated Jan. 19, 2024, pp. 1-20, issued in Korean Application No. 10-2023-0159417, Korean Intellectual Property Office, Seoul, Korea.

Office Action dated Sep. 28, 2024 out of corresponding Korean Patent Application No. 10-2023-0159417 (14 pages) including English translation.

* cited by examiner

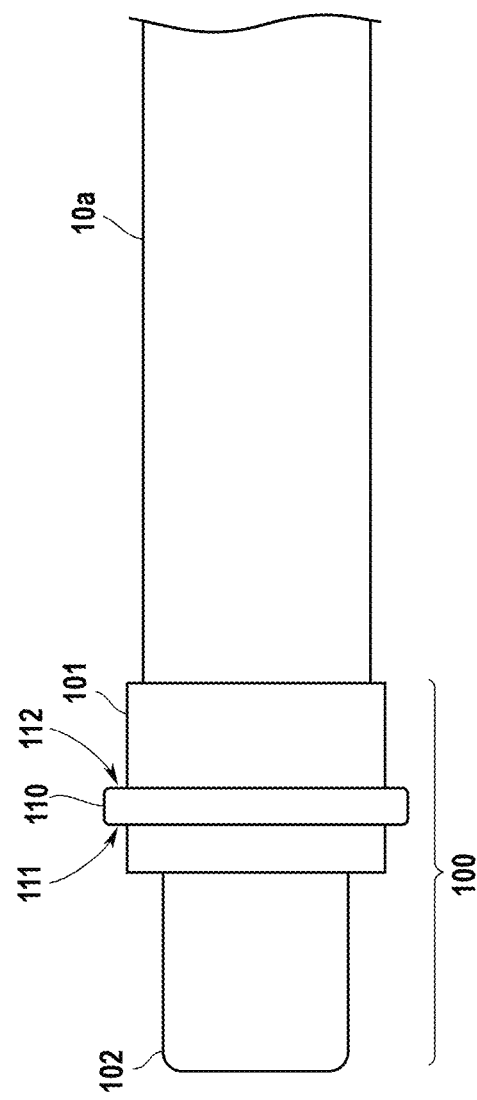
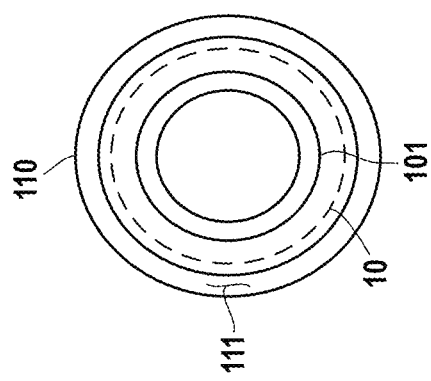

PIPING SYSTEM COMPRISING PIPE BLOCK

CROSS REFERENCE TO RELATED APPLICATION

The present application claims priority to Korean Patent Application No. 10-2023-0159417, filed on Nov. 16, 2023, the entire contents of which is incorporated herein for all purposes by this reference.

BACKGROUND OF THE INVENTION

Field of the Invention

The present invention relates to a piping system, and more particularly, to a piping system including a pipe block.

Description of the Related Art

A vehicle includes a piping system for transporting various fluids, such as a coolant, an engine lubricant, a refrigerant, and/or a transmission fluid. For example, the transmission fluid for a vehicle may be transported from a transmission through a transmission fluid piping system to a transmission fluid cooler, and circulated through a circulation circuit that returns to the transmission through the piping system to operate the transmission.

The pipe system may include a pipe and a pipe block that couples to the pipe. The pipe block may be a member to which a plurality of pipes are coupled, fluid flows into and out of the plurality of pipes, and which fixes and supports the pipes.

SUMMARY OF THE INVENTION

For coupling a pipe and a pipe block in a transmission fluid piping system, a joining method such as welding or brazing has been used in the related art. However, the welding or brazing requires a long process time and high cleanliness, and is vulnerable to defects due to factors such as an operator's error during joining, a poor maintenance of the cleanliness of an operation surface, and/or the introduction of impurities, leading to problems such as breakage or leakage of a piping joint.

According to the present invention, a piping system may be provided in which defects in a coupling portion of a pipe and a pipe block are reduced, and a process time for coupling is reduced.

There is provided a piping system including at least one pipe and a pipe block coupled to one end of the pipe, the pipe may include: a flange positioned at the end of the pipe and protruding in a radially outward direction of the pipe along an outer circumference of the pipe; and a coupling portion having a nipple that is inserted into the pipe block, in which the pipe block may include: an insertion hole into which the pipe is insertively coupled; and a lip protruding from a surface in which the insertion hole is formed in a circumferential direction along an outer circumference of the insertion hole. An inner diameter of the lip may be equal to or greater than an outer diameter of the flange, and when the pipe is coupled to the pipe block, the flange may be positioned within the inner diameter of the lip and the lip is plastically deformed in a radially inward direction of the pipe to grip the flange and fix the pipe to the pipe block.

According to various embodiments, the flange may include a first surface and a second surface positioned in an opposite direction of the first surface, and in which the pipe block may include a flange coupling surface positioned between the insertion hole and the lip along the outer circumference of the insertion hole and facing the first surface of the flange.

According to various embodiments, the piping system may include a seal positioned between the first surface of the flange and the flange coupling surface and made of an elastic material.

According to various embodiments, the flange may include a sealing edge protruding from the first surface along a radial direction of the flange, and in which the sealing edge may be pressed into the flange coupling surface to seal between the first surface and the flange coupling surface upon coupling of the pipe and the pipe block.

According to various embodiments, the sealing edge may have a hardness that is higher than a hardness of the flange coupling surface.

According to various embodiments, the flange may include a sealing protrusion protruding from the first surface along a radial direction of the flange, in which the pipe block may include a sealing groove formed along the radial direction in an area facing the sealing protrusion on the flange coupling surface, and a seal positioned between the first surface and the flange coupling surface of the flange, and in which, upon coupling of the pipe and the pipe block, the seal may be pressed by the sealing protrusion and at least partially inserted into the sealing groove to seal a portion between the first surface and the flange coupling surface.

According to the present invention, while a pipe including a flange is inserted into a pipe block, a lip of the pipe block grips the flange of the pipe so that the pipe and the pipe block are coupled by caulking, thereby allowing the pipe to be easily coupled to the pipe block in a simplified process and providing a piping system with a reduced possibility of defects.

BRIEF DESCRIPTION OF THE DRAWINGS

In connection with the description of the drawings, the same or similar reference numerals may be used for the same or similar constituent elements.

FIG. 3A is a front view illustrating a first pipe according to various embodiments of the present invention.

FIG. 3D is side view illustrating the first pipe of FIGS. 3A-3C according to various embodiments of the present invention.

DETAILED DESCRIPTION OF THE INVENTION

Figure 1:
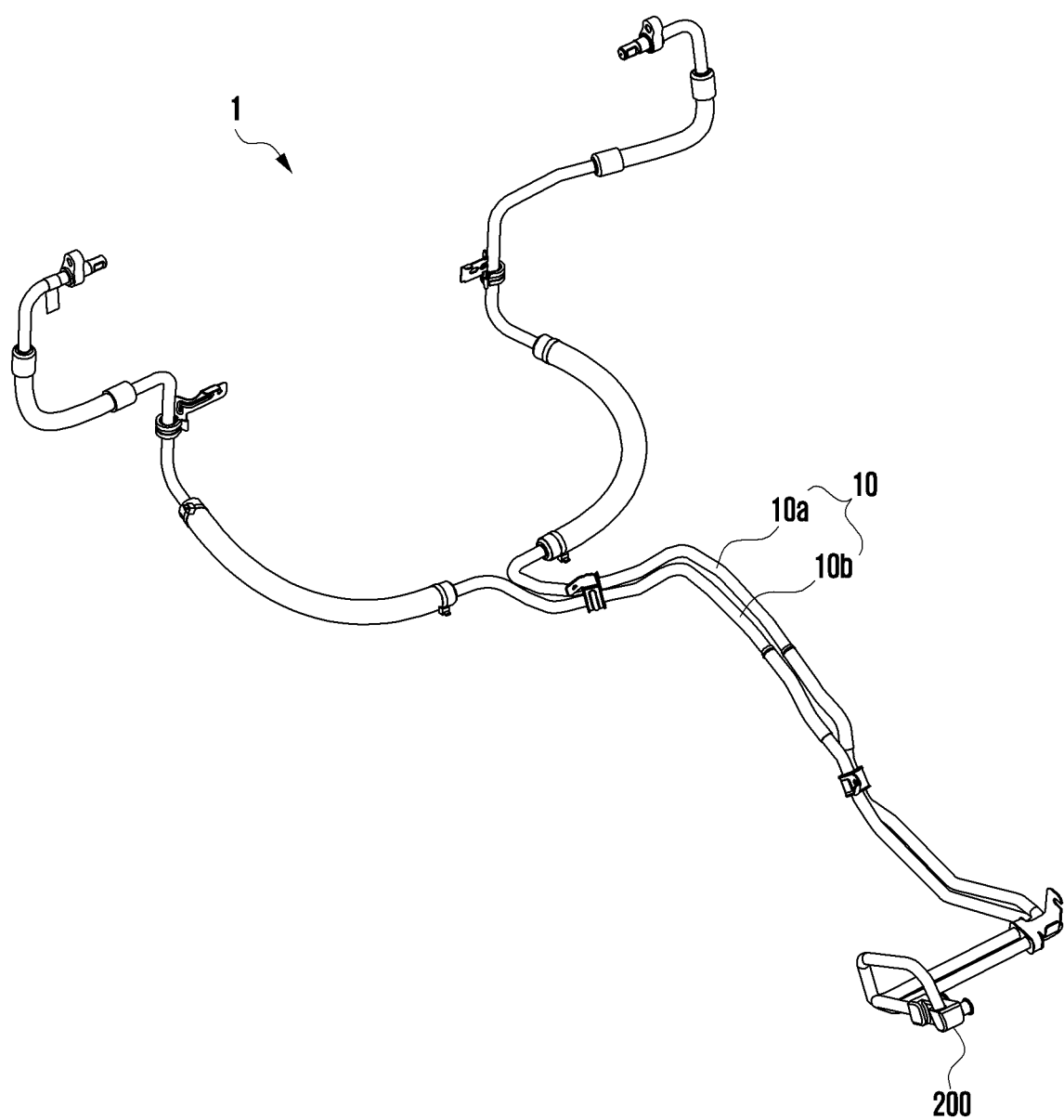
FIG. 1 is a perspective view schematically illustrating a piping system according to various embodiments.

Hereinafter, exemplary embodiments according to the present invention will be described in detail with reference to the accompanying drawings. Embodiments of the present invention are provided to more completely explain the present invention to those skilled in the art. The following embodiments may be modified in various forms, and the scope of the present invention is not limited to the following embodiments. The embodiments are provided to make the present invention more thorough and complete, and to completely convey the spirit of the present invention to those skilled in the art. Further, detailed descriptions of publicly-known functions and configurations, which may obscure the subject matter of the present invention, can be omitted.

In these drawings, for example, the sizes and shapes of members may be exaggerated for convenience and clarity of description, and variations in the illustrated shapes may be expected in actual implementation. Therefore, it should not be interpreted that the embodiments of the present invention are limited to particular shapes of regions illustrated in the present specification. In addition, the term "and/or" used in the present specification includes any one, one or more, or all the combinations of listed related items.

The terms used in the present specification are for explaining the embodiments, not for limiting the scope of the present invention. In addition, the singular expressions used in the present specification may include the plural form unless the context clearly indicates otherwise. In addition, the terms "comprise (include)" and/or "comprising (including)" used in the present specification are intended to specify the presence of the mentioned shapes, numbers, steps, operations, members, elements, and/or groups thereof, but do not exclude presence or addition of other shapes, numbers, steps, operations, members, elements, and/or groups thereof.

In the present specification, a reference to a layer formed "on" a substrate or a different layer may refer to a layer formed immediately above the substrate or the different layer, or may refer to an intermediate layer formed on the substrate or the different layer, or to a layer formed on intermediate layers. In addition, a structure or shape disposed "adjacent" to a different shape may have a portion that overlaps or is disposed underneath the adjacent shape, to those skilled in the art.

In the present specification, relative terms such as "below," "above," "upper," "lower," "horizontal," or "vertical" may be used to describe the relationship of one constituent member, layer, or area to another constituent member, layer, or area, as illustrated in the drawings. It should be understood that these terms include not only the orientation indicated in the drawings, but also other orientations of the elements.

FIG. 1 is a perspective view schematically illustrating a piping system 1 according to various embodiments.

With reference to FIG. 1, the piping system 1 according to various embodiments of the present invention may include a pipe 10 and a pipe block 200. The pipe 10 includes at least one pipe wall that defines an internal space of the pipe 10 through which a fluid, for example a brake fluid, a lubricant, a coolant, and/or a transmission fluid of a vehicle, is transported. The pipe wall may be a single wall or multiple walls with a plurality of layers. A material of the pipe wall may include a polymer, a metal, and/or a composite. The pipe 10 may be part of a circulation circuit that circulates fluid. For example, the pipe 10 that transports the transmission fluid of the vehicle may be part of a cooling circuit that has one end coupled to the transmission and the other end connected to a cooler to cool the transmission fluid. In various embodiments, the piping system 1 may include a plurality of pipes (e.g., a first pipe 10a and a second pipe 10b). One of the first pipe 10a and the second pipe 10b may be a pipe that transports fluid to the cooler, and the other may be a pipe that transports fluid from the cooler to another constituent element of the piping system 1.

The pipe block 200 may be a portion coupled to the pipe 10 to connect the plurality of pipes 10, support the pipe 10, and/or distribute fluid flowing through the pipe 10. In various embodiments, a material of the pipe block 200 may include the same or similar material as the material of the pipe wall of the pipe 10. The detailed constitution of the pipe block 200 will be described below.

Figure 2A:
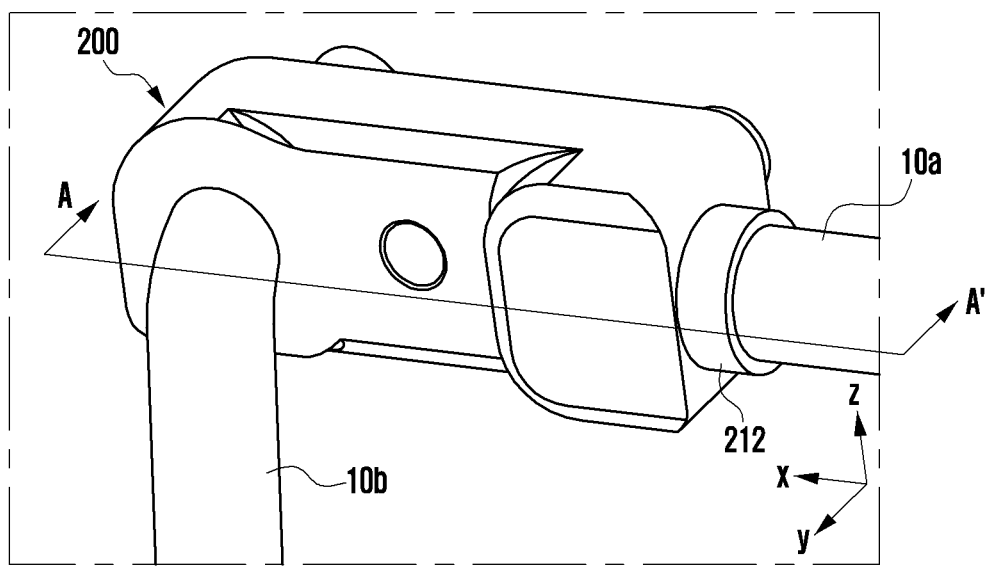
FIG. 2A is a perspective view illustrating a pipe block according to various embodiments of the present invention.

FIG. 2A is a perspective view illustrating the pipe block 200 according to various embodiments of the present invention.

Figure 2B:
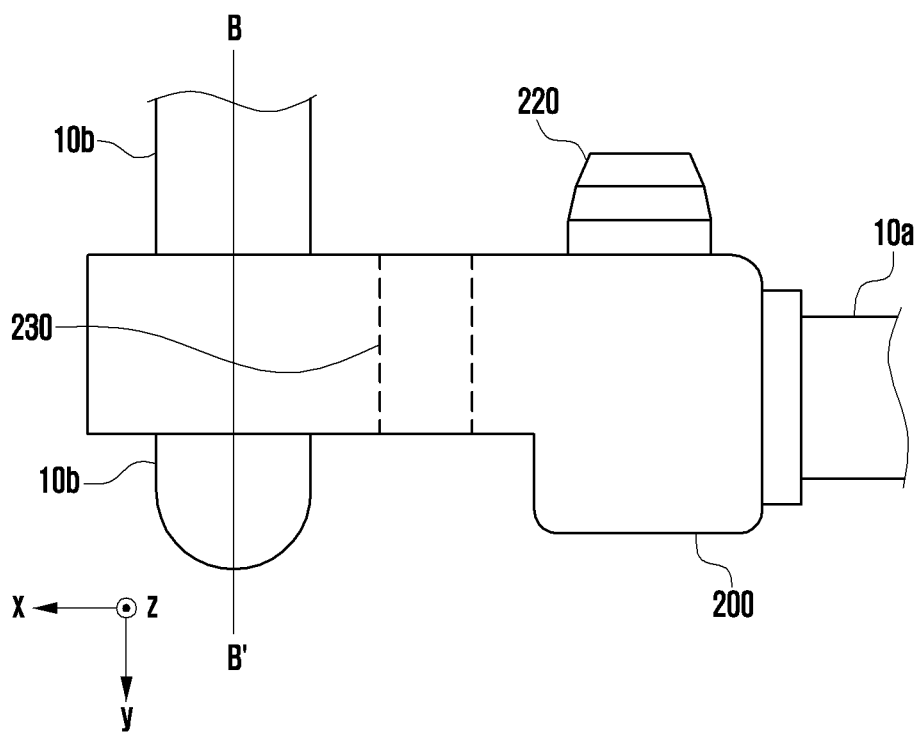
FIG. 2B is a front view illustrating the pipe block according to various embodiments of the present invention.

FIG. 2B is a front view illustrating the pipe block 200 according to various embodiments of the present invention.

Figure 2C:
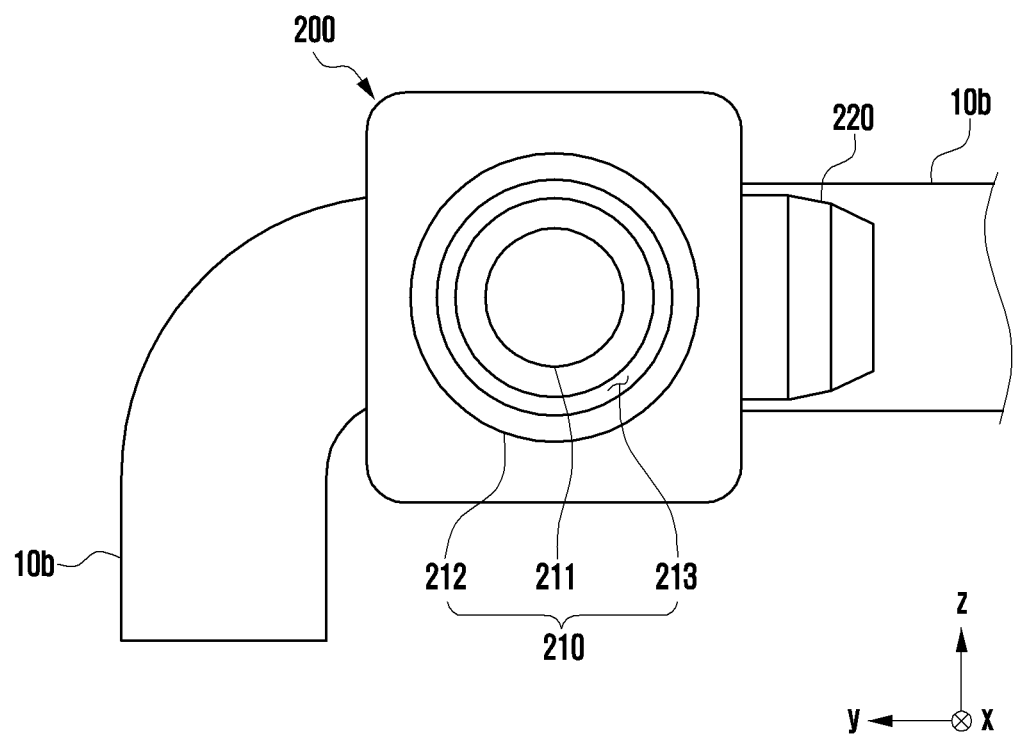
FIG. 2C is a side view illustrating the pipe block according to various embodiments of the present invention.

FIG. 2C is a side view illustrating the pipe block 200 according to various embodiments of the present invention.

Figure 2D:
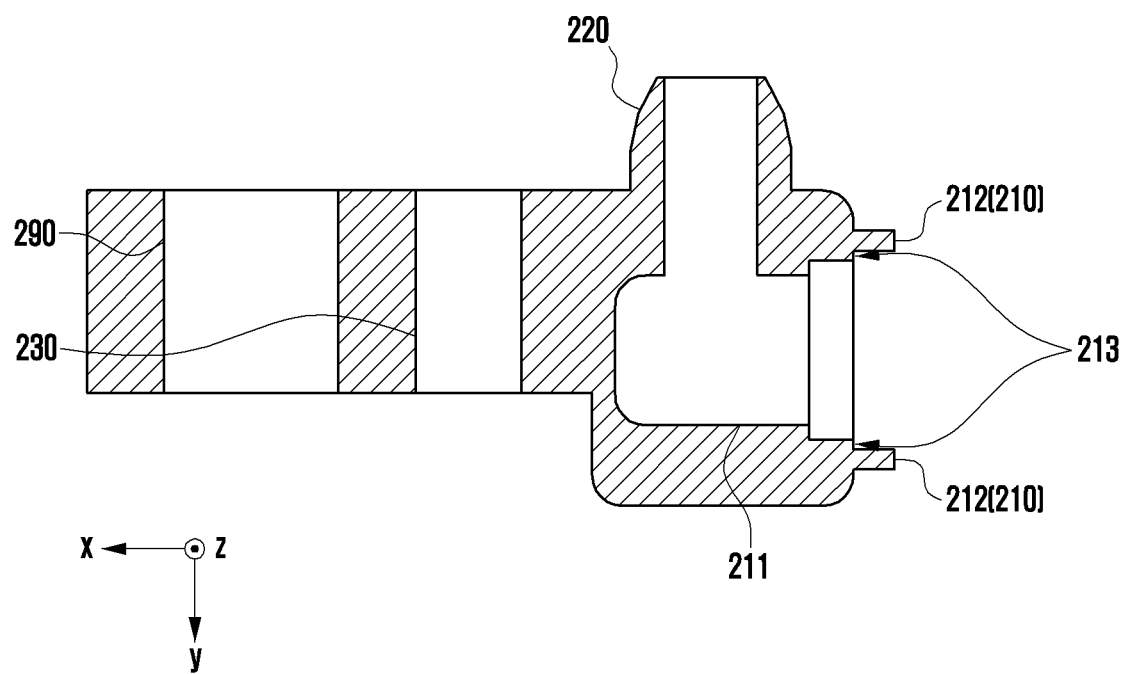
FIG. 2D is a cross-sectional view illustrating the pipe block according to various embodiments of the present invention.

FIG. 2D is a cross-sectional view illustrating the pipe block 200 according to various embodiments of the present invention.

Figure 2E:
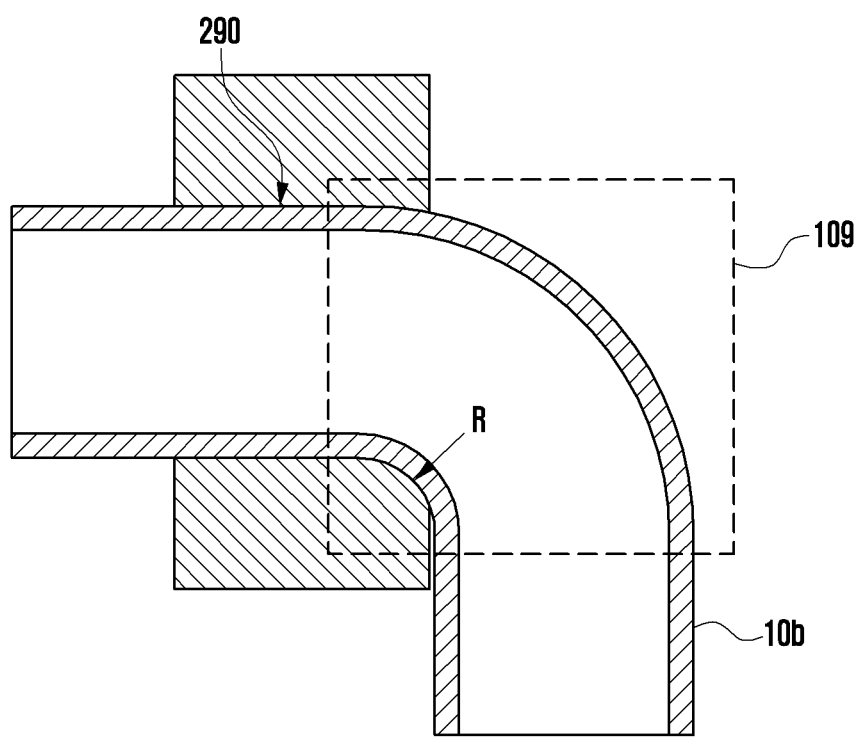
FIG. 2E is a cross-sectional view illustrating the pipe block according to various embodiments of the present invention.

FIG. 2E is a cross-sectional view illustrating the pipe block 200 according to various embodiments of the present invention.

A cross-section in FIG. 2D is a cross sectional surface in a direction taken along line A-A' in FIG. 2A.

A cross-section in FIG. 2E is a cross sectional surface in a direction taken along line B-B' in FIG. 2B.

With reference to FIGS. 2A to 2D, the pipe block 200 may include an inflow portion 210 and an outflow portion 220. The inflow portion 210 may be a portion to which the pipe 10 (e.g., the first pipe 10a) is insertively coupled to allow fluid to flow into the pipe block 200. The outflow portion 220 may be a portion for fluid that has flowed into the pipe block 200 through the inflow portion 210 to flow out to a separate pipe (not illustrated) or another constituent element of the pipe system.

The inflow portion 210 may include a lip 212, a flange coupling surface 213, and an insertion hole 211. The lip 212 may be a portion that grips a flange 110 of a coupling portion 100 of the pipe 10 (e.g., the first pipe 10a) to couple the coupling portion 100 to the pipe block 200, as described below.

The lip 212 may be a member protruding from a surface of the pipe block 200 at a periphery of the insertion hole 211 along an outer circumference of the insertion hole 211. The flange coupling surface 213 may be a portion of the surface of the pipe block 200 that directly or indirectly faces the flange 110 of the coupling portion 100 described below. The lip 212 may be positioned at a periphery of the flange coupling surface 213, and the insertion hole 211 may be formed at a center of the flange coupling surface 213.

The insertion hole 211 may be an insertion hole formed from the surface of the pipe block 200 into an interior of the pipe block 200 for a nipple 102 of the coupling portion 100 described below to be inserted.

The insertion hole 211 may be connected to a flow path of the outflow portion 220 inside the pipe block 200. Therefore, the fluid that flows into the pipe block 200 from the nipple 102 of the pipe 10 may flow out of the outflow portion 220.

In various embodiments, the pipe block 200 may include a fixing hole 230. The fixing hole 230 may be a portion that couples with a bolt, a rivet, or similar fastening means to fix the pipe block 200 to a fixing means, such as a mount or a bracket (not illustrated).

With reference to FIGS. 2D and 2E, in various embodiments, the pipe block 200 may include a pipe insertion portion 290. The pipe insertion portion 290 may be, for example, a recessed portion or a through-hole formed for the pipe (e.g., the second pipe 10b) to be insertively fixed. In various embodiments, the second pipe 10b may have a bending portion 109, and the pipe insertion portion 290 may have an internal shape at least partially corresponding to the bending portion 109 such that at least a portion of the bending portion 109 is insertively fixed. The second pipe 10b may be effectively fixed to the pipe insertion portion 290 by the structure described above.

FIG. 3A is a front view illustrating the first pipe 10a according to various embodiments of the present invention.

Figure 3B:
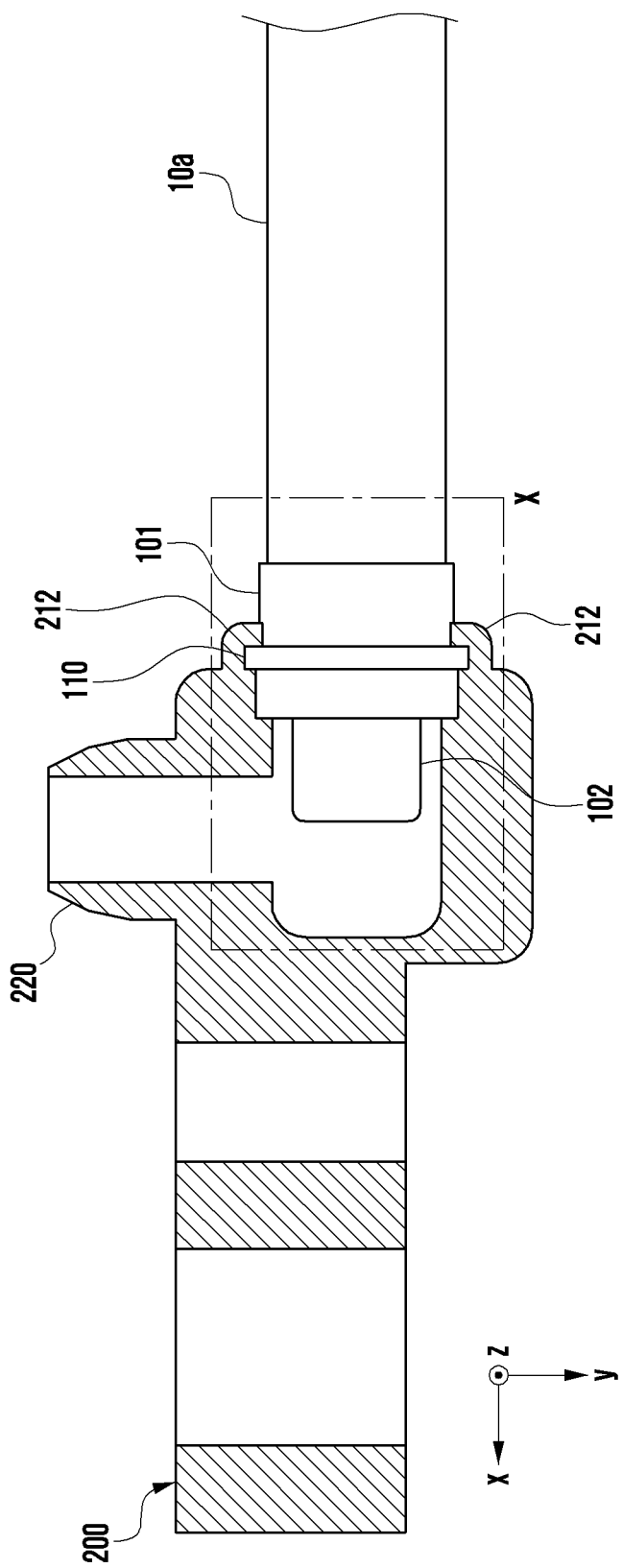
FIG. 3B is a cross-sectional view illustrating coupling of the pipe and pipe block of the piping system according to various embodiments of the present invention.

FIG. 3B is a cross-sectional view illustrating coupling of the pipe 10 and pipe block 200 of the piping system 1 according to various embodiments of the present invention.

Figure 3C:
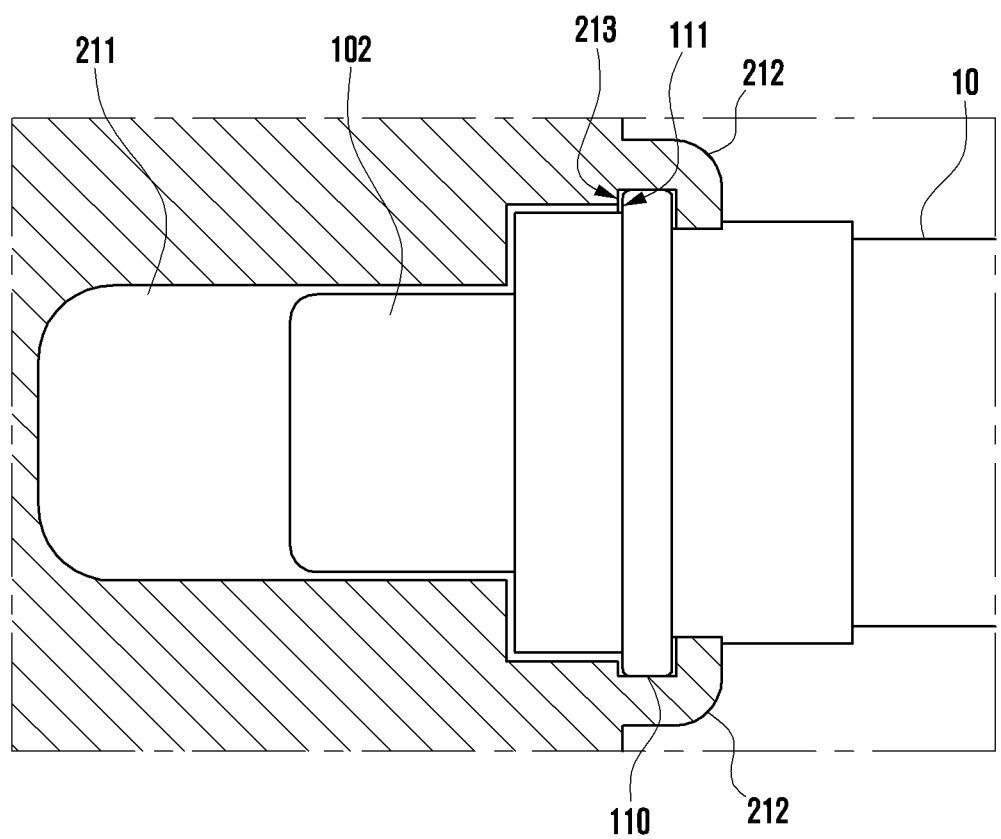
FIG. 3C is an enlarged cross-sectional view illustrating coupling of the pipe and pipe block of the piping system according to various embodiments of the present invention.

FIG. 3C is an enlarged cross-sectional view illustrating coupling of the pipe 10 and pipe block 200 of the piping system 1 according to various embodiments of the present invention.

FIG. 3C is an enlarged view of an X portion in FIG. 3B.

FIG. 3D is side view illustrating a first pipe according to various embodiments of the present invention.

With reference to FIG. 3A and FIG. 3D, the pipe 10 (e.g., the first pipe 10a) may include a main body of the first pipe 10a and the coupling portion 100 positioned at one end of the main body of the first pipe 10a. The coupling portion 100 may be a portion that couples one end of the first pipe 10a to the pipe block 200.

In various embodiments, the coupling portion 100 may include a sleeve 101, the nipple 102, and the flange 110. The sleeve 101 may be a member that couples the coupling portion 100 to an end portion of the first pipe 10a. In various embodiments, the sleeve 101 may include the same or similar material as the first pipe 10a. Various known coupling methods may be used to couple the sleeve 101 with the first pipe 10a, such as shrink-fitting, crimping, welding, and/or brazing. The nipple 102 may be a portion that is inserted into an insertion hole of the nipple 102 of the pipe block 200 to introduce fluid into the pipe block 200.

The flange 110 may be a portion that protrudes in a radial direction from a center of a hose, along an outer circumference of the sleeve 101. A diameter of the flange 110 may be equal to or less than an inner diameter of the lip 212 of a nut of the first pipe 10a. An outer diameter of the flange 110 and the inner diameter of the lip 212 may have a suitable level of clearance for the flange 110 to be insertively assembled into the inner diameter of the lip 212, as described below. The flange 110 may have a first surface 111, which is a surface facing a direction in which an end of the hose is positioned (e.g., in the direction of the x-axis in the drawing), and a second surface 112 positioned opposite to the first surface 111.

With reference to FIGS. 3B and 3C, the coupling portion 100 may be inserted into and coupled to the pipe block 200. The nipple 102 is inserted into the insertion hole of the nipple 102, the first surface 111 of the flange 110 faces the flange coupling surface 213 of the pipe block 200, and the lip 212 of the pipe block 200 is plastically deformed toward the second surface 112 of the flange 110. Accordingly, the coupling portion 100 of the first pipe 10a may be fixed and coupled to the pipe block 200 by pressing the flange 110 against the direction in which the first pipe 10a is inserted (e.g., in the direction of the x-axis in the drawing). This method of coupling of the first pipe 10a by plastic deformation may be referred to as caulking.

The plastic deformation of the lip 212 may be performed by striking the lip 212 using a die of a shape corresponding to the lip 212, or by tightening the lip 212 from the outside inward with respect to a radial direction of the lip 212. In various embodiments, the lip 212 may include a metal and/or alloy material (e.g., aluminum, brass, and/or mild steel) suitable for plastic deformation.

Figure 4A:
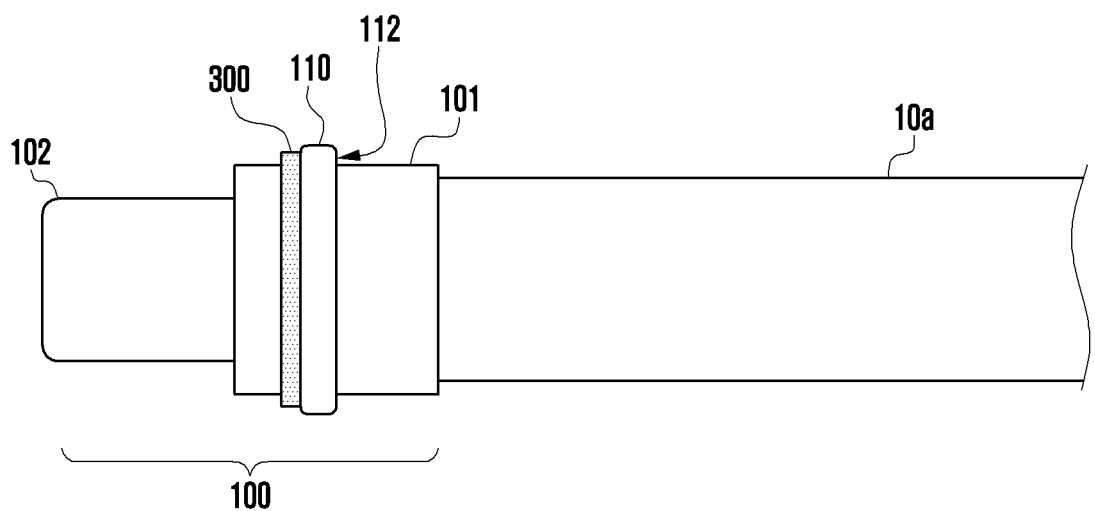
FIG. 4A is a side view illustrating the first pipe according to various embodiments of the present invention.

FIG. 4A is a side view illustrating the first pipe 10a according to various embodiments of the present invention.

Figure 4D:
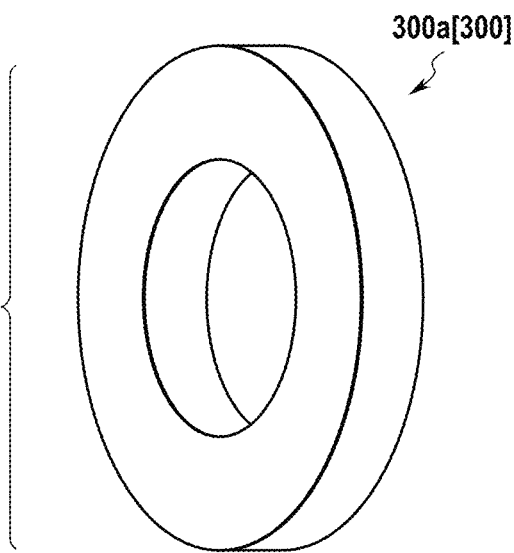
FIG. 4D is a perspective view illustrating a seal according to various embodiments of the present invention.
Figure 4B:
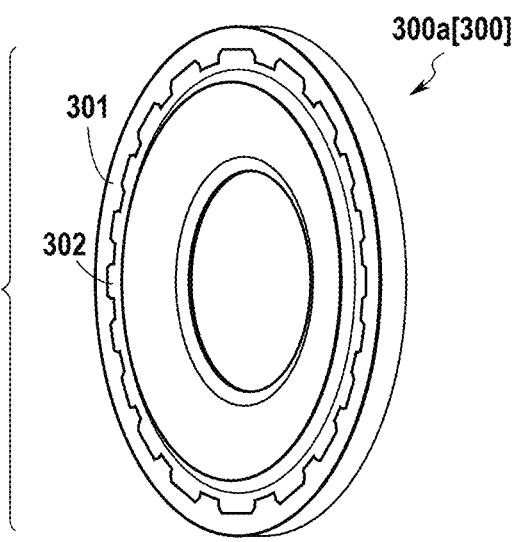
FIG. 4B is a cross-sectional view illustrating a seal according to various embodiments of the present invention.

FIG. 4B is a cross-sectional view illustrating a seal 300 according to various embodiments of the present invention.

Figure 4C:
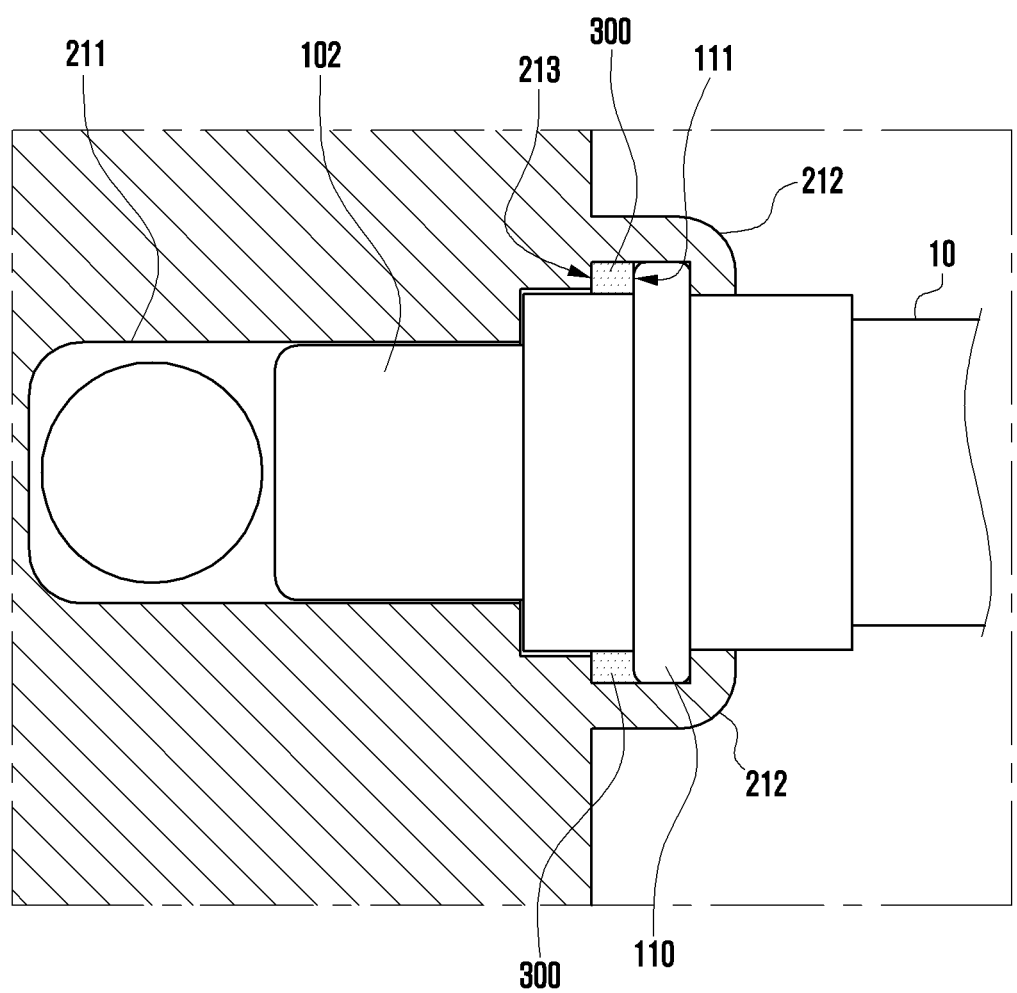
FIG. 4C is an enlarged cross-sectional view illustrating coupling of the first pipe and the pipe block of the piping system according to various embodiments of the present invention.

FIG. 4C is an enlarged cross-sectional view illustrating coupling of the pipe 10 and pipe block 200 of the piping system 1 according to various embodiments of the present invention.

FIG. 4D is a perspective view illustrating a seal according to various embodiments of the present invention.

With reference to FIGS. 4A, 4B, and 4D, the pipe system 1 may include a seal 300. The seal 300 may include, for example, a simple seal 300a illustrated in FIG. 4D or a complex seal 300b illustrated in in FIG. 4B. The simple seal 300a may be a seal made substantially and entirely of an elastic material (e.g., rubber, NBR, TPU, and/or silicone). The complex seal 300b may be a seal including a first ring 301 including an elastic material and a second ring 302 including a material having a higher hardness compared to the first ring (e.g., metal), in which the second ring 302 is fixed against the first ring 301 and constituted to support the second ring 302.

With reference to FIG. 4C, the seal 300 may be positioned between the flange 110 of the pipe 10 (e.g., the first pipe 10a) and the flange coupling surface 213 of the pipe block 200. The seal 300 may be disposed to enclose an outer circumference of the coupling portion 100 of the first pipe 10a along the flange 110 and the flange coupling surface 213. The seal 300 may be tightly in contact with the first surface 111 of the flange 110 and the flange coupling surface 213 of the pipe block 200 by an operation that plastically deforms the lip 212 upon coupling of the first pipe 10a and the pipe block 200.

Since the lip 212 is plastically deformed so that the seal 300 is tightly in contact with the first surface 111 of the flange 110 and the flange coupling surface 213 of the pipe block 200 to seal a space between the two surfaces, according to the present invention, the outflow of fluid between the pipe and the pipe block can be effectively blocked without the need for a joining treatment such as welding, soldering, or brazing. In addition, the risk of fluid leakage due to failure of the above-mentioned joint treatment (e.g., microscopic gaps or cracks due to poor welds) is reduced. In addition, since the sealing between the pipe 10a and the pipe block 200 is achieved by a simple operation such as caulking, the productivity of an assembly operation for the pipe system 1 may be improved compared to fastening a separate pipe fastening member (or pipe fitting).

Figure 5A:
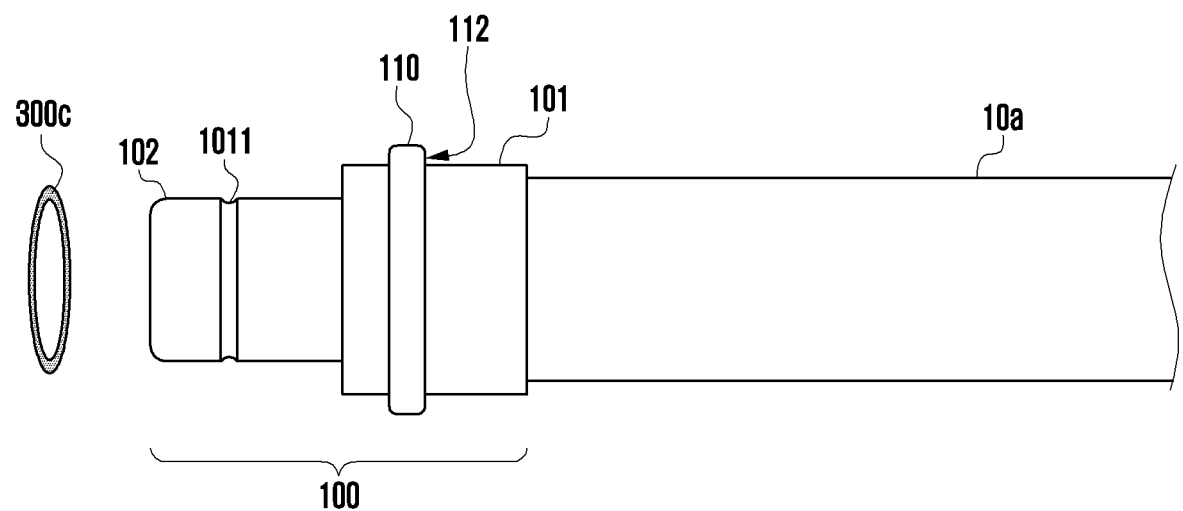
FIG. 5A is a side view illustrating the pipe and an o-ring according to various embodiments of the present invention.

FIG. 5A is a side view illustrating the pipe 10 and an o-ring 300c according to various embodiments of the present invention.

Figure 5B:
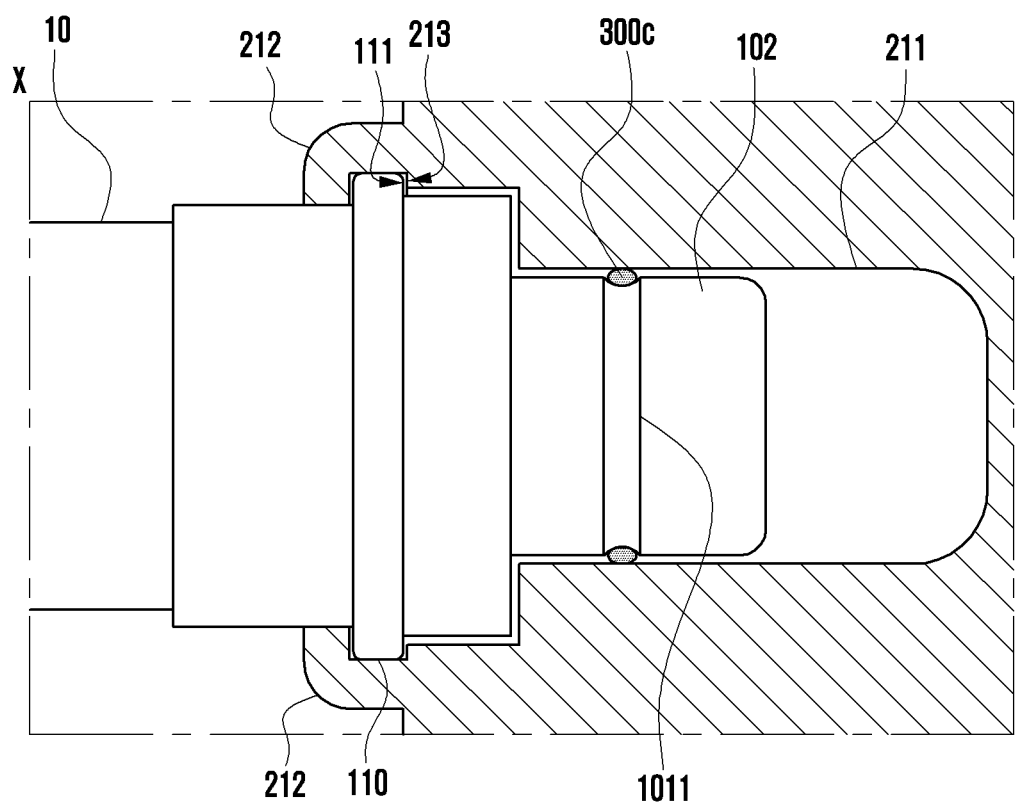
FIG. 5B is an enlarged cross-sectional view illustrating coupling of the pipe and pipe block of the piping system according to various embodiments of the present invention.

FIG. 5B is an enlarged cross-sectional view illustrating coupling of the pipe 10 and pipe block 200 of the piping system 1 according to various embodiments of the present invention.

With reference to FIGS. 5A and 5B, the pipe system 1 may include an o-ring 300c. The o-ring 300c may be one example of the seal 300. The o-ring 300c may be, for example, a member of an elastic material formed in a toroidal shape with a circular cross-section. In various embodiments, the pipe 10 (e.g., the first pipe 10a) may include an o-ring seating groove 1011 formed for the o-ring 300c to be seated in. The o-ring seating groove may be formed, for example, along a circumferential surface of the nipple 102 in a lateral direction.

In various embodiments, when the coupling portion 100 of the first pipe 10a is inserted into the pipe block 200, the o-ring 300c may be tightly in contact with an inner wall of the insertion hole 211 to seal a portion between the insertion hole 211 and a surface of the nipple 102. The lip 212 may be plastically deformed by the caulking to fix the coupling portion 100, thereby preventing or reducing the state of sealing described above from being broken by the o-ring 300c due to wiggling of the nipple 102.

Figure 6A:
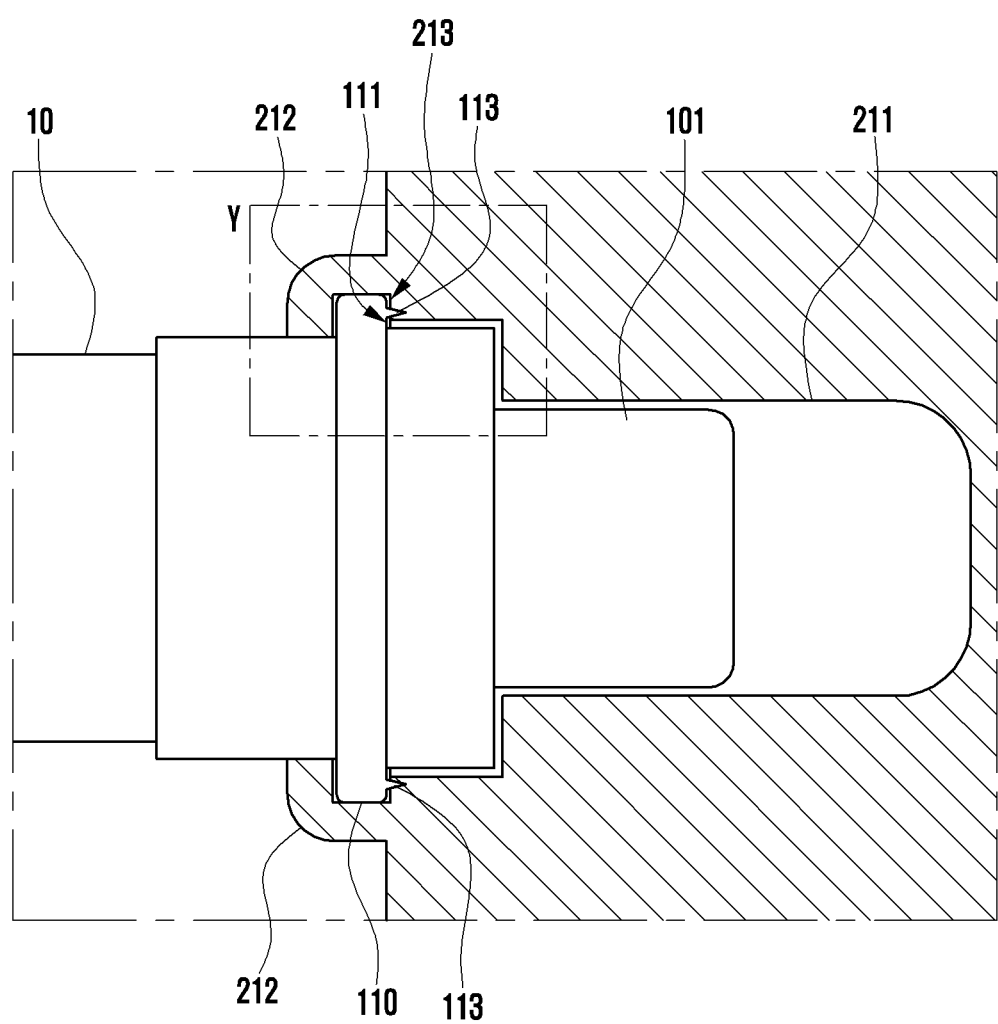
FIGS. 6A to 6C are enlarged cross-sectional views illustrating coupling of the first pipe and the pipe block according to various embodiments.
Figure 6B:
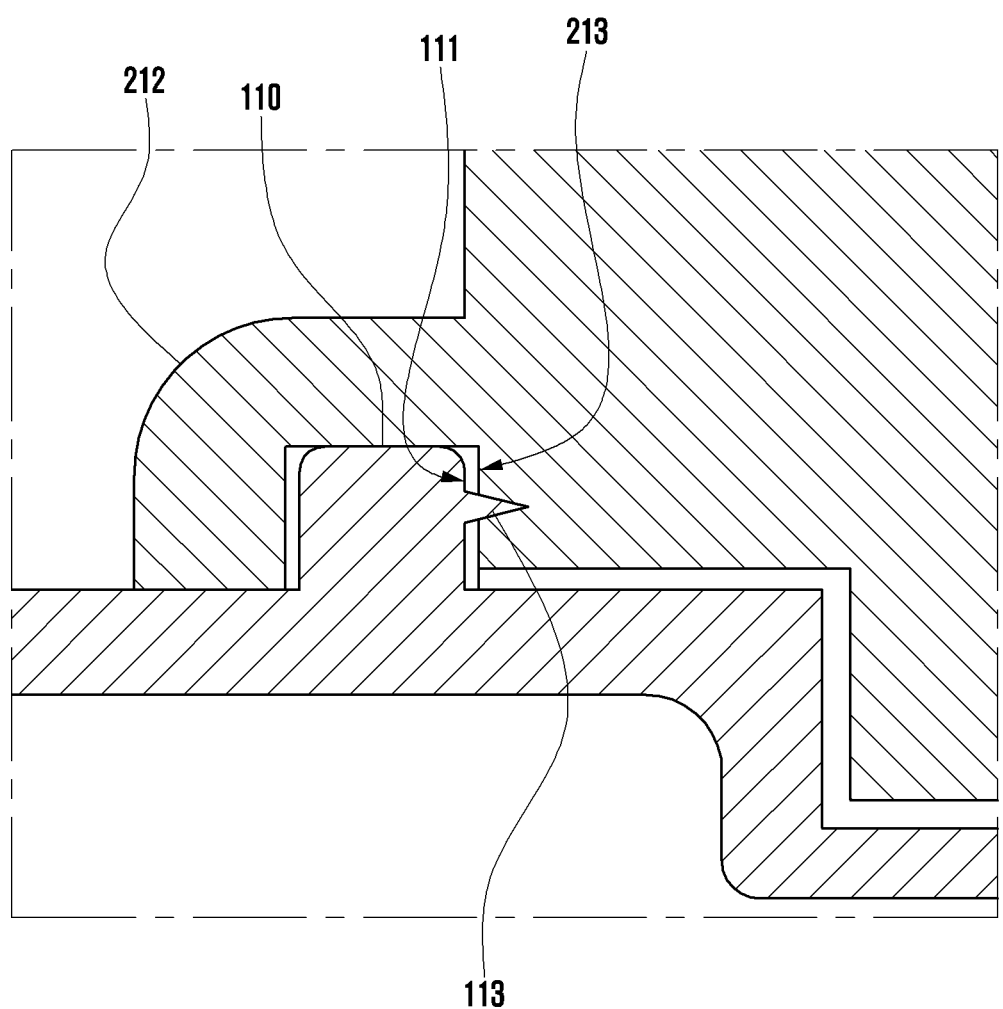
Figure 6C:
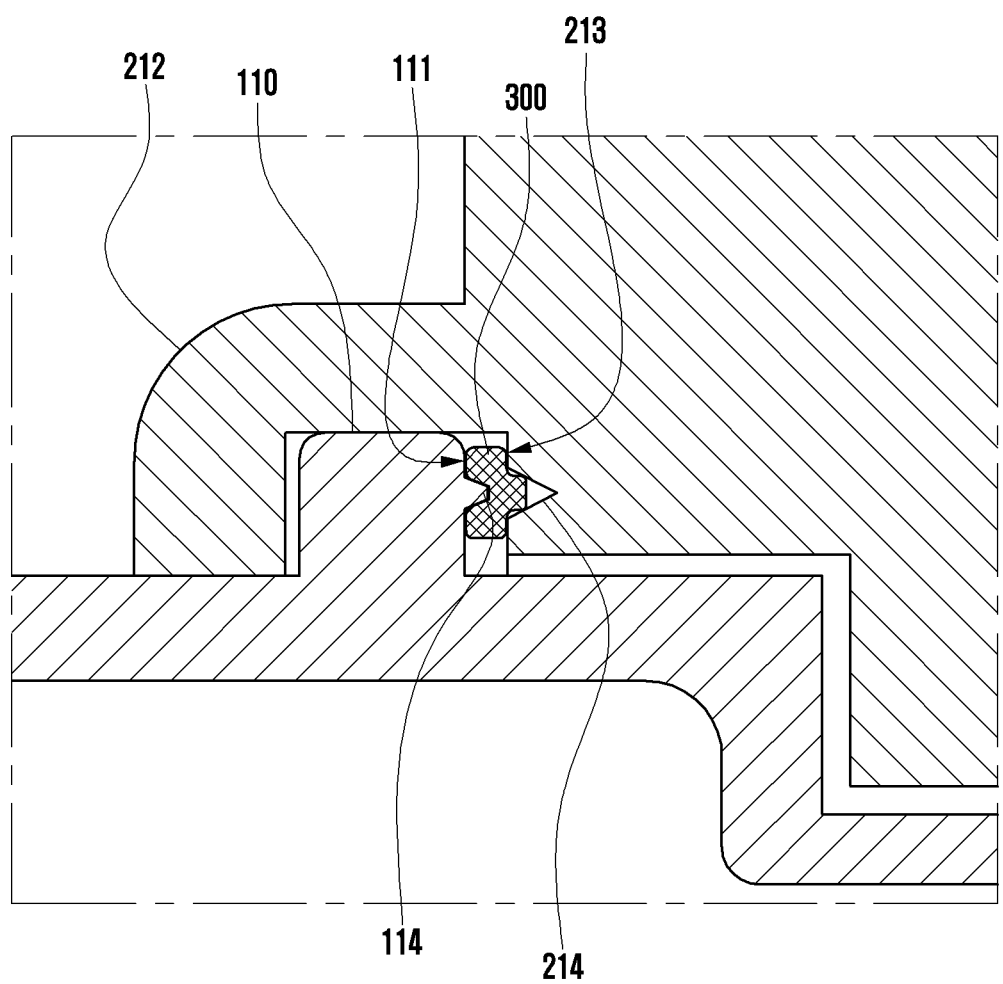

FIGS. 6A to 6C are enlarged cross-sectional views illustrating coupling of the first pipe 10a and the pipe block 200 according to various embodiments.

FIGS. 6B and 6C are enlarged cross-sectional views of a Y area in FIG. 6A.

With reference to FIGS. 6A to 6C, the flange 110 may include a sealing edge 113. The sealing edge 113 may protrude from the first surface 111 of the flange 110 and be positioned along a radial direction of the first surface 111 of the flange 110. Upon coupling of the first pipe 10a and the pipe block 200, the sealing edge 113 may be pressed into the flange coupling surface 213. In various embodiments, the sealing edge 113 has a higher hardness than the flange coupling surface 213, such that the sealing edge 113 may be pressed into the flange coupling surface 213. A portion between the first surface 111 of the flange 110 and the flange coupling surface 213 may be effectively sealed by the sealing edge 113 being pressed into the flange coupling surface 213.

With reference to FIG. 6C, the flange 110 may include a sealing protrusion 114, and the flange coupling surface 213 may include a sealing groove 214 formed in an area corresponding to the sealing protrusion 114. The sealing protrusion 114 may protrude from the first surface 111 of the flange 110, and be positioned along the radial direction of the first surface 111 of the flange 110. The seal 300 may be positioned between the first surface 111 of the flange 110 and the flange coupling surface 213.

Upon coupling of the first pipe 10a and the pipe block 200, the sealing protrusion 114 may press the seal 300 against the sealing groove 214. The seal 300 may be at least partially inserted into the sealing groove 214 by the pressing of the sealing protrusion 114. The seal 300 may be plastically deformed and/or elastically deformed by the pressing of the sealing protrusion 114. A material of the plastically deformable seal 300 may include, for example, copper, aluminum, or a metal having the similar ductility as the copper and aluminum, and/or a polymer resin. Since the seal 300 is deformed by the pressing of the sealing protrusion 114 and inserted into the sealing groove 214, the seal 300 can be tightly in contact with the sealing protrusion 114 and the surface of the sealing groove 214. Therefore, a portion between the first surface 111 of the flange 110 in which the sealing protrusion 114 is formed and the flange coupling surface 213 can be effectively sealed.

Further, the embodiments disclosed in the present document disclosed in the present specification and illustrated in the drawings are provided as particular examples for easily explaining the technical contents according to the embodiment disclosed in the present document and helping understand the embodiment disclosed in the present document, but not intended to limit the scope of the embodiment disclosed in the present document. Accordingly, the scope of the various embodiments disclosed in the present document should be interpreted as including all alterations or modifications derived from the technical spirit of the various embodiments disclosed in the present document in addition to the embodiments disclosed herein.

| Description of Reference Numerals | |
|---|---|
| 1: Piping system | 10: Pipe |
| 100: Coupling portion | 101: Sleeve |
| 102: Nipple | 110: Flange |
| 111: First surface | 112: Second surface |
| 113: Sealing Edge | 114: Sealing protrusion |
| 200: Pipe block | 210: Inflow portion |
| 211: Insertion hole | 212: Lip |
| 213: Flange coupling surface | 214: Sealing groove |
| 220: Outflow portion | 230: Fixing hole |
| 300: Seal | |

What is claimed is:

1. A piping system comprising:
    a first pipe;
    a second pipe; and
    a pipe block coupled to the first pipe and the second pipe,
    wherein the first pipe comprises:
        a flange positioned at an end portion of the first pipe, protruding in a radially outward direction of the first pipe along an outer circumference of the first pipe, and
        a coupling portion having a nipple that is inserted into the pipe block,
        an o-ring seating groove formed along a circumferential surface of the nipple in a lateral direction,
            wherein the flange comprises a first surface and a second surface positioned in an opposite direction of the first surface, and
    wherein the second pipe comprises:
        a bending portion with a curvature; and
    wherein the pipe block comprises:
        a pipe insertion portion coupled to the second pipe;

an insertion hole into which the first pipe is insertively coupled;

a lip protruding from a surface in which the insertion hole is formed in a circumferential direction along an outer circumference of the insertion hole, a flange coupling surface positioned between the insertion hole and the lip along the outer circumference of the insertion hole and facing the first surface of the flange, and wherein an inner diameter of the lip is equal to or greater than an outer diameter of the flange, wherein, when the first pipe is coupled to the pipe block, the flange is positioned within the inner diameter of the lip, and the lip is plastically deformed toward the second surface of the flange to caulk the flange, so that the first pipe is fixed to the pipe block, wherein a seal, positioned between the first surface of the flange and the flange coupling surface seals between the first surface of the flange and the flange coupling surface and made of a first elastic material and the first pipe is fixed to the pipe block;

wherein an o-ring, seated in the o-ring seating groove, is in tight contact with an inner wall of the insertion hole so that that the o-ring seals between the insertion hole and a surface of the nipple, wherein the pipe insertion portion has a curvature corresponding to the curvature of the bending portion to fix the second pipe to the pipe insertion portion, wherein the seal comprises a first ring comprising the first elastic material and a second ring comprising a material having a hardness greater than a hardness of the first ring, and wherein the o-ring comprises a second elastic material.

2. The piping system of claim 1, wherein the flange comprises a sealing protrusion protruding from the first surface along a radial direction of the flange, wherein the pipe block comprises a sealing groove formed along the radial direction in an area facing the sealing protrusion on the flange coupling surface, and wherein, upon coupling of the first pipe and the pipe block, the seal is pressed by the sealing protrusion and at least partially inserted into the sealing groove to seal a portion between the first surface and the flange coupling surface.

* * * * *